July 12, 1955

J. H. SCHMID 2,712,871

DUPLEX STRAINER

Filed June 2, 1951

INVENTOR.
JOHN H. SCHMID
BY
Florian G. Miller
Atty.

July 12, 1955  J. H. SCHMID  2,712,871
DUPLEX STRAINER

Filed June 2, 1951  4 Sheets-Sheet 3

INVENTOR.
JOHN H. SCHMID
BY
Florian G. Muller
Atty.

July 12, 1955  J. H. SCHMID  2,712,871
DUPLEX STRAINER

Filed June 2, 1951  4 Sheets-Sheet 4

INVENTOR.
JOHN H. SCHMID
BY
Florian G. Miller
Atty.

United States Patent Office 2,712,871
Patented July 12, 1955

2,712,871
DUPLEX STRAINER

John H. Schmid, Erie, Pa., assignor to J. A. Zurn Mfg. Co., Erie, Pa., a corporation of Pennsylvania Application June 2, 1951, Serial No. 229,606

4 Claims. (Cl. 210—168)

This invention relates generally to fluid strainers and more particularly to gate type duplex strainers for separating foreign matter in suspension carried by a fluid.

Duplex strainers now require a comparatively large space for a given straining area of the strainer. The valve operating mechanism in present duplex strainers requires considerable area in the casing. It is necessary for the fluid to take several right angled turns in present duplex strainers, thereby greatly impeding the flow of fluid therethrough and increasing the pressure drop. Where any appreciable flow of fluid is necessary through these strainers, it is necessary to have a comparatively large sized strainer casing, especially where it is desired to have an open area of strainers six or more times that of the inlet opening for the fluid into the strainer member. It is difficult to operate the valves in these present strainers, especially when they become corroded. The valves are complicated and consist of a large number of parts. The arrangement of the strainers and the valve operating elements in these present strainers is complicated. Most present duplex strainers require a large chamber above the strainer elements, thereby greatly increasing the size of the strainer casing. It has heretofore not been feasible to place a duplex strainer on many ships and other places where space is at a premium because of the large area required for present type duplex strainers.

It is, accordingly, an object of my invention to overcome the above and other defects in present duplex strainers and it is more particularly an object of my invention to provide a duplex strainer which is simple in construction, economical in cost, and efficient in operation.

Another object of my invention is to provide a duplex strainer having means for selectively directing fluid through one or more strainers while shutting off one or more other strainers.

Another object of my invention is to provide indicating means on a duplex strainer to determine the position of the valve with relation to a selected straining chamber inlet.

Another object of my invention is to provide a valve mechanism for a duplex strainer which requires a minimum of space.

Another object of my invention is to provide a duplex strainer wherein the strainers may be arranged in parallel relationship for selective service and alternately cleaned.

Another object of my invention is to provide a duplex strainer with easily removable angled strainer baskets to permit straight-through flow of fluid, minimizing the pressure drop through the strainer and insuring complete retention of the strainer particles when the basket is being removed for cleaning.

Another object of my invention is to provide a strainer with hinged covers with novel means for opening same which permits one man to remove the covers in a minimum of time.

Another object of my invention is to provide a gate type duplex strainer with an operating screw for operating the gate valve which is not exposed to the liquid to be strained or to outside dust and dirt.

Another object of my invention is to provide a gate valve assembly wherein the valve disk floats freely, it is easily removed through a valve access cover, and there is no binding of the valve operating mechanism.

Other objects of my invention will become evident from the following detailed description, taken in conjunction with the accompanying drawings, in which Fig. 1 is a top plan view of my novel duplex strainer with parts thereof broken away for better illustration;

Figure 1:
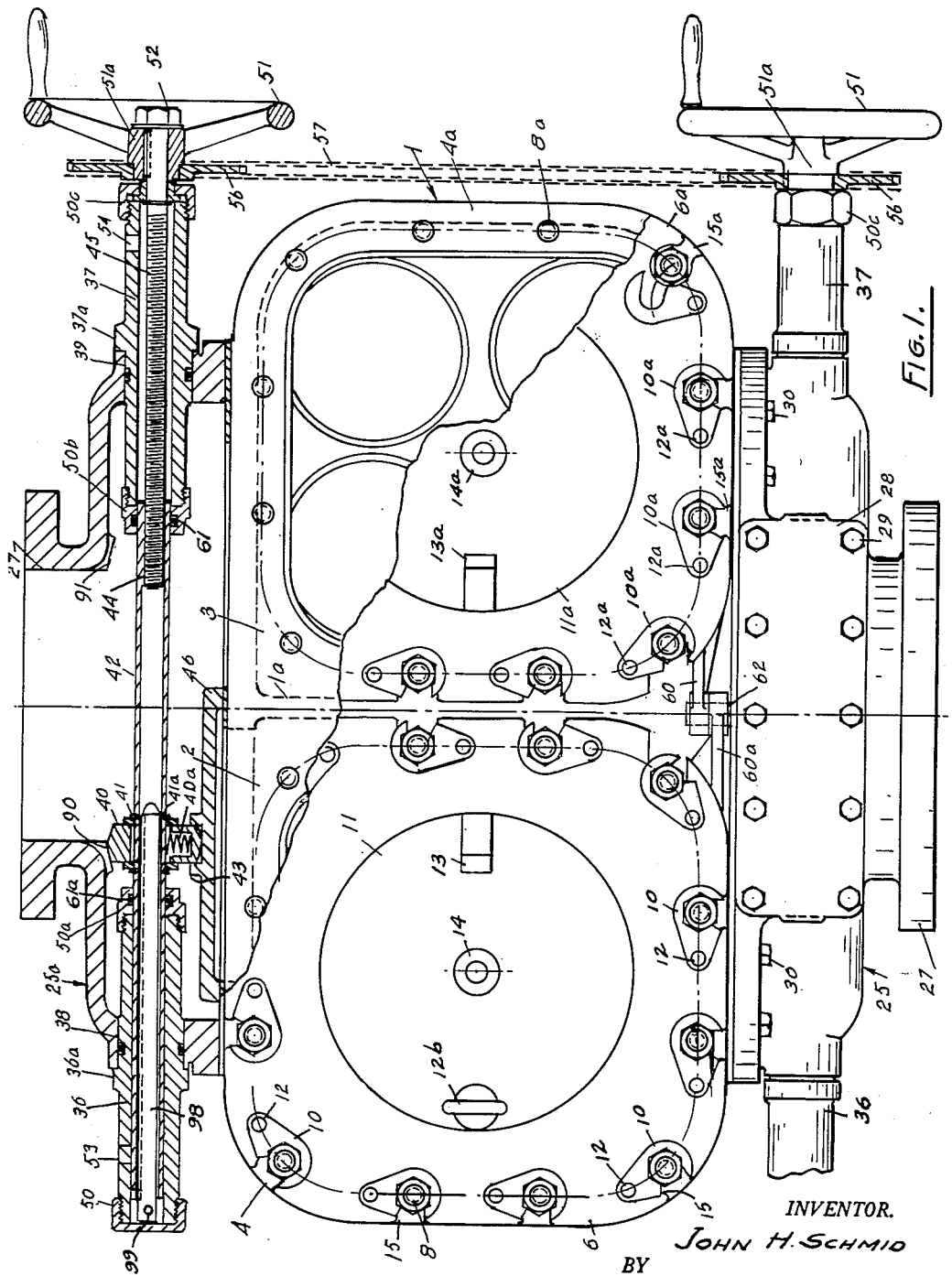
Figure 2:
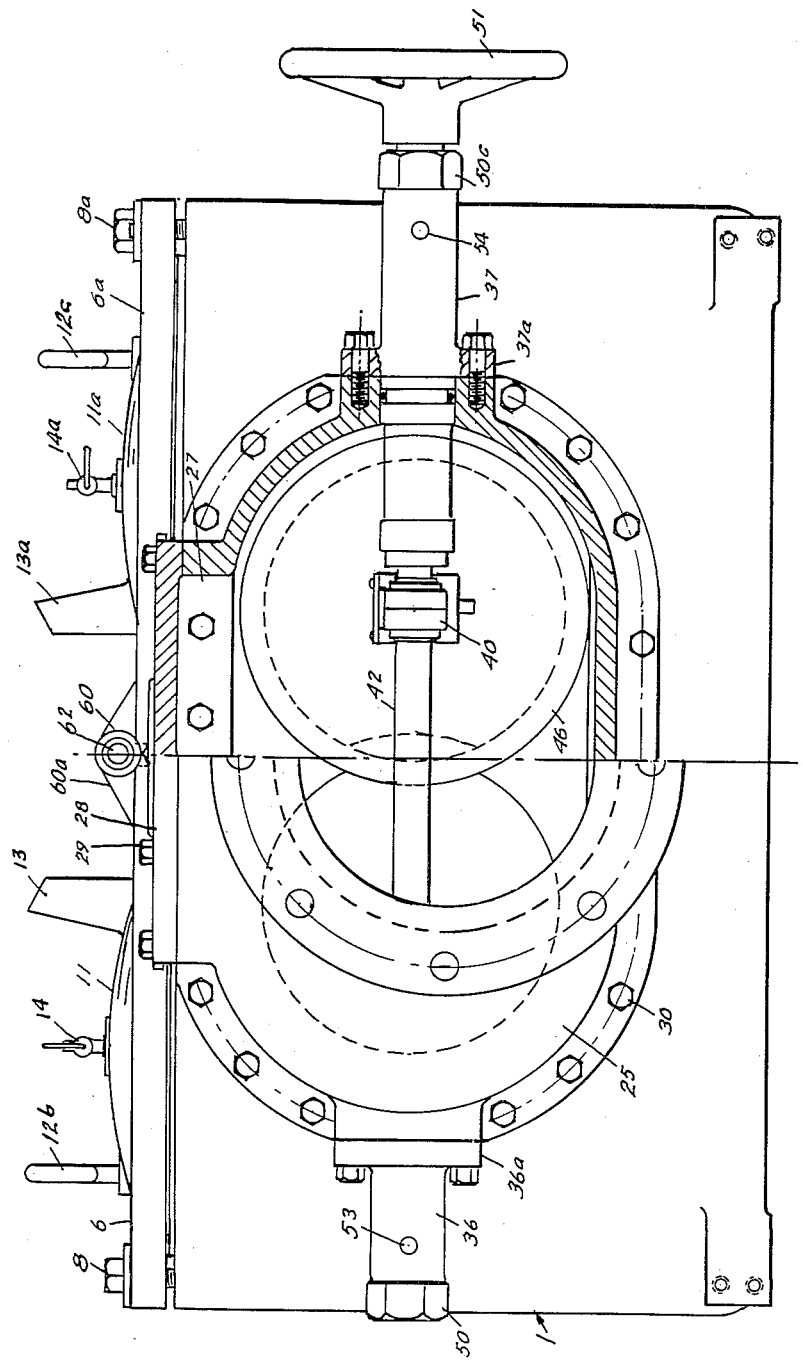
Fig. 2 is a side elevational view, partly broken away, of my novel strainer.
Figure 3:
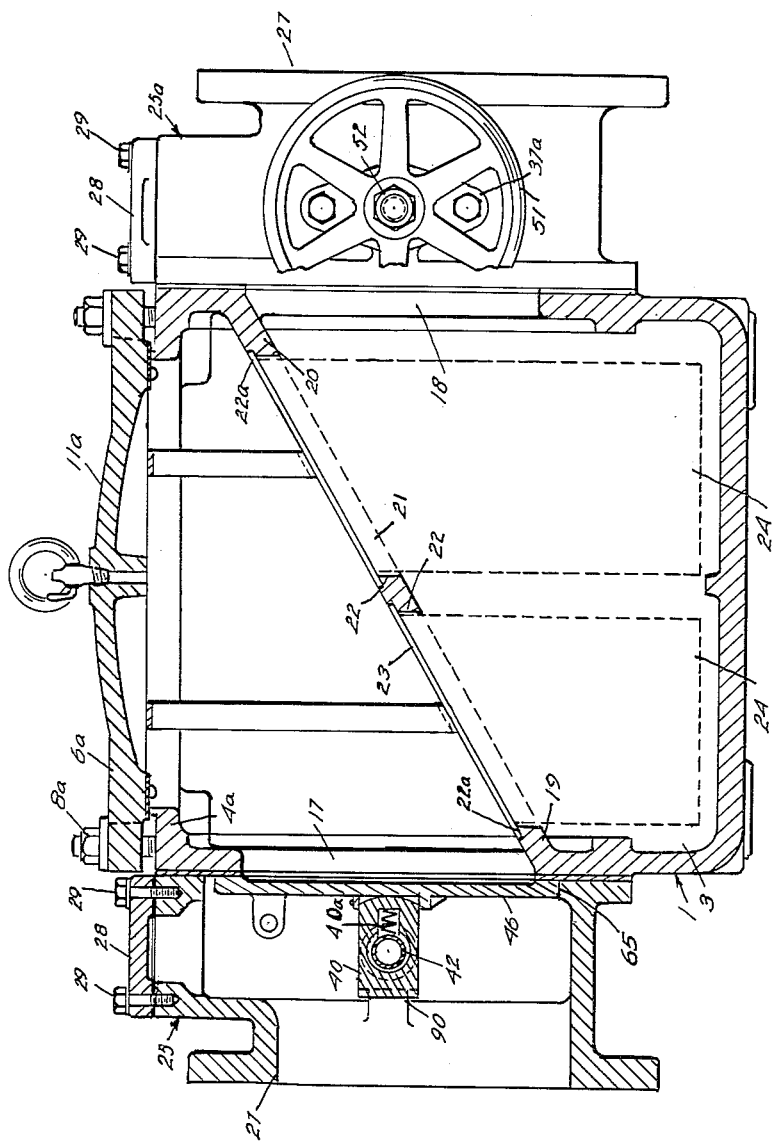
Fig. 3 is a transverse vertical sectional view of my novel strainer.

Referring now to the drawings, I show in Figs. 1 to 3 inclusive a generally rectangular shaped casing 1 having an intermediate separating wall 1a forming compartments 2 and 3 with upper terminal flanges 4 and 4a. Hinged covers 6 and 6a are disposed on the flanges 4 and 4a and they are secured thereto by screw bolts 8 and 8a and C-washers 10 and 10a pivoted on screw bolts 12 and 12a, respectively. The covers 6 and 6a have comparatively large, spaced apertures 15 and 15a around the periphery thereof through which the heads of the screw bolts 8 and 8a pass and which are covered by the C-washers 10 and 10a. The covers 6 and 6a have central convex surfaces 11 and 11a and eye bolt handles 12b and 12c. Projecting rest members 13 and 13a in the covers 6 and 6a, respectively, hold the covers a little past dead center in an upward open position to prevent undue stresses on the hinges for the covers 6 and 6a. Air relief valves 14 and 14a are disposed centrally of the covers 6 and 6a.

The chambers 2 and 3 in the casing 1 are identical and each has an inlet aperture 17 on one side thereof and an outlet aperture 18 on the opposite side thereof. The lower ends 19 of an inclined baffle 21 extend inwardly and upwardly from the lower termini of the inlet apertures 17 and the upper ends 20 of the inclined baffles 21 extend inwardly and downwardly from the upper termini of the outlet apertures 18, the baffles 21 being integral with the casing 1. The baffles 21 have apertures 22 with marginal grooves 22a for seating the upper flanged portions 23 of perforated straining baskets 24 therein, the upper flanged portions 23 of the straining baskets 24 being inclined or angled so as to be in the same horizontal plane as the top surface of the baffles 21.

The covers 6 and 6a are hinged to each other by transversely apertured arms 60 and 60a having screw pins 62 extending through the apertured overlapping ends thereof.

Substantially identical inlet and outlet valve casings 25 and 25a are secured to the inlet and the outlet sides of the casing 1 by screw bolts 30 and cover the inlet apertures 17 and the outlet apertures 18, respectively, in both of the chambers 2 and 3. Both the inlet valve casing 25 and the outlet valve casing 25a have a flanged opening 27 and a removable cover 28 secured by screw bolts 29. Only the outlet casing 25a is shown in section in Fig. 1; however, all operating elements and structure are the same in the inlet casing 25 so like numbers will be used. Elongated, bored, cylindrical members or journals 36 and 37 (Fig. 1) are sealingly disposed in apertures 38 and 39 in the valve casings 25 and 25a, respectively, the cylindrical members 36 and 37 having raised shoulders 36a and 37a in engagement with the outer sides of the valve casings 25 and 25a. Telescoping sleeves 42 slide in the bores of the cylindrical members or journals 36 and 37 and they are internally threaded at 44 for threadable engagement with feed screws 45. Members 40 are mounted on the sleeves 42 tensioned by springs 40a and they are held against relative longitudinal movement with reference to the sleeves 42 by stop clips 41 disposed in spaced grooves 41a in the sleeves 42. The members 40 engage projecting grooved members 43 on the back of circular, slightly dished, gate valves or valve disks 46, the feed screws 45 moving the sleeves 42 longitudinally to move the gate valves or valves disks 46 to a position to selectively open or close either of the inlet or outlet apertures 17 or 18 in the chambers 2 and 3. Internally threaded end caps 50 and 50a threadably engage the threaded end of the cylindrical member 36, each of the end caps 50a having an internal peripheral groove for nesting a sealing washer 61a. Internally threaded caps 50b and 50c engage the threaded ends of the cylindrical member 37, each of the end caps 50b having an internal peripheral groove for nesting a sealing washer 61. The valve casings 25 and 25a have laterally spaced abutments 90 and 91 engageable by the members 40 to limit the lateral movement of the sleeves 42 and valve disks 46. Handwheels 51 are secured to the ends of the feed screws 45 by nuts 52. The journal members 36 and 37 have sight holes 53 and 54, respectively, on opposite ends of the valve casings 25 and 25a for indicating the position of the sleeves 42 so as to determine the closed or opened position of the gate valves 46 with relation to the inlet ports 17 and the outlet ports 18 in the chambers 2 and 3 of the casing 1. Sprocket wheels 56 are fixedly mounted on the hubs 51a of the handwheels 51 over which is trained a sprocket chain 57 so that the valve operating mechanism on the inlet and the outlet sides of the casing 1 operate in unison. The sprockets 56 and chain 57 may be eliminated and the valve operating mechanism on each side may be operated independently if this is desired. Torque bars 98 are telescoped in the sleeves 42 for guiding same, the torque bars 98 being secured to the cylindrical members 36 by transverse pins 99.

The valve disks 46 move laterally on a guideway 65 (Fig. 3) in the valve casings 25 and 25a.

One man may operate my novel duplex strainer. My angle basket design permits straight-through flow, minimizing the pressure drop and insuring complete retention of the strained particles when the baskets are being removed for cleaning. There are no right angled turns required of the fluid passing through the strainer. The operating feed screws 45 are not exposed to the liquid passing through the strainer since they are protected by stainless steel sleeves 42 sealed with O-ring seals 61a and 61. The outer side of the screws 45 are protected by journal members 37. Thus, the screws 45 cannot be touched by corrosion or foreign particles in the liquid on the inside or by dirt or physical things on the outside of the strainer. The free floating valve disks 46 have no obstructions so that there is no binding in moving from one port to the other. The disks 46 are easily removed by removing valve access covers 28 on the valve casings 25 and 25a. The free floating valve disks 46 insure against binding of the valve operating mechanism. The valve disks 46 have no screws or other connection with the sleeves 42 so that they merely need be dropped in place. By utilizing a chain drive, continuous operational flow is assured inasmuch as the valve disks on the inlet and outlet side of the strainer move in unison. A bypass valve (not shown) may be provided where high pressures are encountered to assure easier turning of the handwheel 51.

In the operation of my novel duplex strainer shown in Figs. 1 to 3 inclusive, inlet and outlet pipes are connected to the flanged openings 27 of the inlet and outlet valve casings 25 and 25a. By rotation of the handwheels 51 in the desired direction, the gate valve 46 in the inlet valve casing 25 may be selectively disposed over the inlet ports 17 in the chamber 2 or 3 and, likewise, the gate valve 46 in the outlet casing 25a selectively covers the outlet ports 18 in the chamber 2 or 3 to selectively open or close either of the inlet or outlet ports 17 and 18. The fluid will pass directly from the selected inlet port 17 to the selected outlet port 18 through the chamber selected and through the strainer baskets therein. The strainer baskets 24 are easily removed by loosening the screw bolts 8 or 8a, turning the C-washers 10 or 10a, and lifting the selected cover from the chamber not in operation. The strainer baskets 24 are then easily lifted through the top of the chamber 2 or 3. The open area ratio of the straining area of the baskets with relation to the inlet port is preferably six or more to one.

Figure 4:
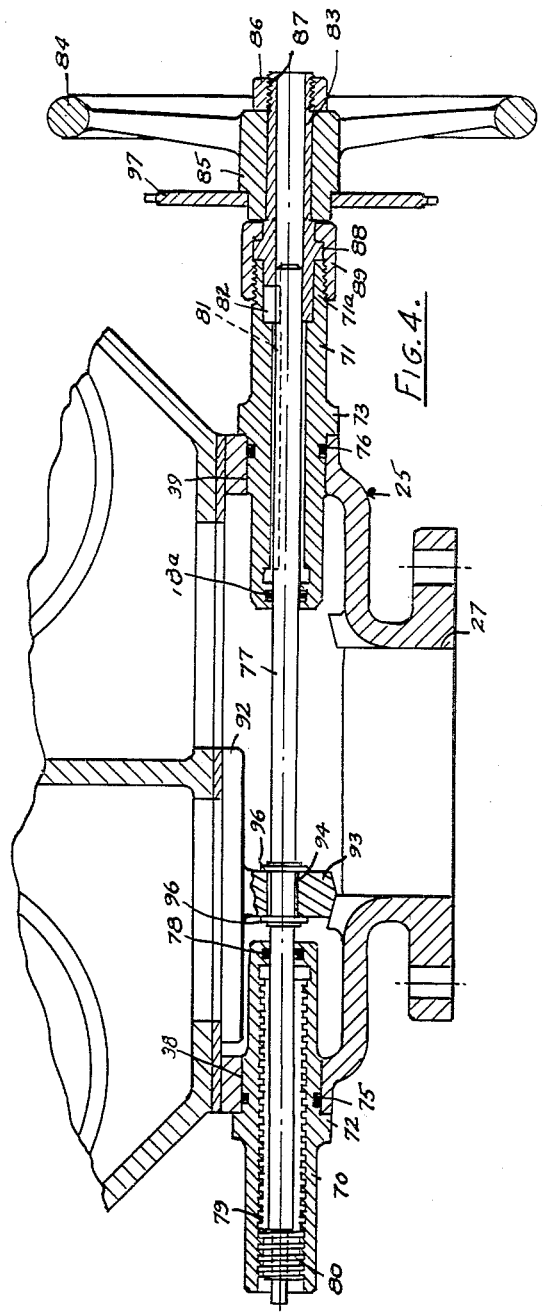
Fig. 4 is a fragmentary sectional view showing a modified form of gate operating mechanism for my novel duplex strainer.

In Fig. 4, I show a modified form of valve operating mechanism for my novel duplex strainer. I only show and describe the inlet valve casing and operating mechanism; however, the outlet valve casing and operating mechanism are substantially identical. The valve casings and the strainer casing are the same as the corresponding valve casings 25 and 25a and strainer casing 1 heretofore described. Journals 70 and 71 are disposed in the apertures 38 and 39 in the valve casing 25. The journals 70 and 71 have shoulders 72 and 73 for abutment against the outer sides of the casing 25. The journals 70 and 71 also carry sealing washers 75 and 76 for sealing engagement with the inner sides of the apertures 38 and 39 in the valve casing 25. A rod 77 is slidably disposed in the journals 70 and 71 and sealed by end seals 78 and 78a in the ends of the journals 70 and 71. The journal 70 has internal square threads 79 for threadable engagement with a threaded head 80 on the rod 77. The rod 77 also has a keyway 81 in slidable engagement with a key 82 on a hollow sleeve 83 on which a handwheel 84 is mounted. The handwheel 84 has a hub 85 and it is held on the sleeve 83 by a nut 86 connected to the threaded end 87 of the sleeve 83. The sleeve 83 has a raised shoulder 88 engageable by an internally threaded cup shaped member 89 threadably engaged with the threaded end 71a of the journal 71. A disk valve 92 has a projecting portion 93 with an aperture 94 through which extends the rod 77, the disk valve 92 being held against longitudinal movement relative to the rod 77 by spring stop clips 96. A sprocket wheel 97 is mounted on the hub 85 of the handwheel 84 over which a sprocket chain may be trained to operate the valve operating mechanism on the inlet and outlet sides in unison.

In the operation of the valve operating mechanism shown in Fig. 4, the handwheel 84 is rotated, causing the longitudinal movement of the rod 77 when the threaded head 80 thereon moves in the threaded portion 79 of the journal 70. The disk valve 92 moves longitudinally with the rod 77 to selectively cover the inlet apertures 17 in the casing 1. This valve casing may be disposed on the inlet side or the outlet side of the strainer casing.

It will be evident from the foregoing description that I have provided a novel gate type valve duplex strainer wherein the valve disk is free floating, it is easily removable, the valve operating mechanism is simple and protected against corrosion and dirt, the strainer basket open area ratio to the inlet opening is six to one or greater with a minimum size of strainer, right angled turns of the fluid are eliminated, fluid flows directly through the casing, thereby minimizing impedance of the flow of fluid through the strainer and the pressure drop, wherein angled baskets are provided to insure complete retention of the strainer particles when the basket is being removed for cleaning, and one which permits easy removal of the covers on the strainer to permit the removal of the strainer baskets.

Various changes may be made in the specific embodiment of my invention without departing from the spirit thereof or from the scope of the appended claims.

What I claim is:

1. A multiple strainer comprising a casing having a plurality of compartments, each compartment having an inlet on one side thereof and an outlet on the opposite side thereof, said inlet and said outlet being substantially in alignment with each other, a partition in each compartment attached to the walls thereof and disposed between said inlet and said outlet of each compartment, said partitions inclined upwardly from the bottom of said inlets to the tops of said outlets, a plurality of spaced apertures formed in each said partition, said apertures in each plate being disposed in alignment with one of said inlets and one of said outlets, a strainer basket in each said aperture, the tops of said strainer baskets being inclined parallel to the inclination of said baffle with the upper edges thereof disposed adjacent said partition, said strainer supported on said partition extending downward from said partition and terminating at the lower end thereof in spaced proximate relation to the bottom of said casing, said casing having an opening in the top of each compartment with covers removably supported thereover, valves for selectively closing said inlet and outlet apertures in each of said compartments and means for operating said valves.

2. A multiple strainer as set forth in claim 1 wherein the means for operating said valves comprises screw operated means on opposite sides of said casing, a grooved projection on the back of said valves, and a cylindrical member attached to and movable with said screw operated means and engaging the grooved members on said valves, and resilient means engaging said screw operated means, said cylindrical member urging said valves into sealing engagement.

3. A multiple strainer as set forth in claim 1 wherein the means for operating said valves comprises feed screws on the inlet and outlet sides of said casing, threaded sleeves threadably engaging said feed screws for relative movement longitudinally thereof and transversely of said inlet and outlet apertures, handles for rotating said feed screws to move said sleeves longitudinally relative thereto, valve disks for selectively closing said inlet and outlet ports connected to said sleeves, means for connecting said sleeves and said valve disks, and means for slidably supporting said sleeves.

4. A multiple strainer comprising a strainer casing having a plurality of compartments, each compartment having an inlet port and an opposed outlet port, removable strainers disposed in each of said compartments, covers for each of said compartments, valve casings on opposite sides of said strainer casing covering said inlet and outlet ports having an opening for connection to inlet and outlet pipe lines, laterally slidable valve disks disposed in said valve casings for selectively closing said inlet and outlet ports in said casing, an internally threaded, longitudinally movable sleeve journalled in each of said valve casings, journals in said valve casings for journalling said sleeves and spaced sealing means between said journals and said sleeves sealing the space therebetween against the flow of liquid therebetween, feed screws in each of said valve casings threadably engaged therewith and movable relative thereto, means connecting said sleeves and said disks intermediate said journals for moving said disks with said sleeves, and means for rotating said feed screws.

References Cited in the file of this patent

UNITED STATES PATENTS

| 782,866 | Merrill | Feb. 21, 1905 |
| 1,152,831 | Monteagle | Sept. 7, 1915 |
| 1,189,077 | Elliott | June 27, 1916 |
| 1,213,764 | Elliott | Jan. 23, 1917 |
| 2,068,468 | Phillips | Jan. 19, 1937 |
| 2,552,991 | McWhorter | May 15, 1951 |

FOREIGN PATENTS

| 15,905 | Great Britain | 1889 |
| 275,383 | Great Britain | Aug. 11, 1927 |